(No Model.)
L. K. & C. A. WILLIAMS.
MACHINE FOR SHEARING SHEET METAL.
No. 430,718. Patented June 24, 1890.
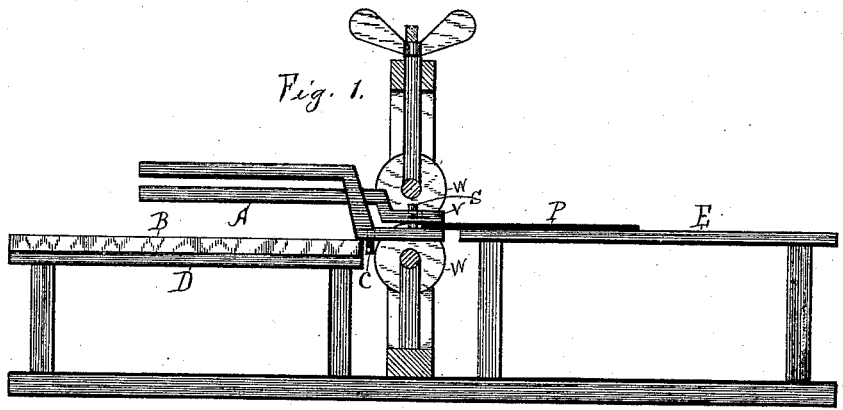
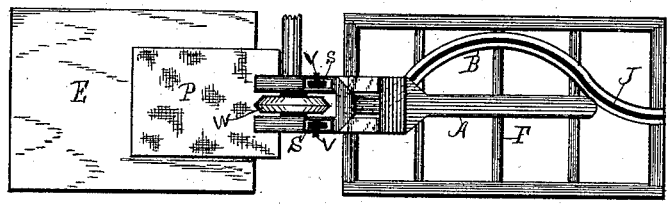
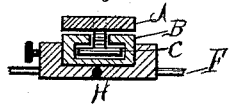
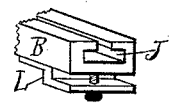
Witnesses
K. C. Hutchins
Edward M. Bray
Inventors
Levi K. Williams
Charles A. Williams By
Thos. H. Hutchins atty

UNITED STATES PATENT OFFICE.

LEVI K. WILLIAMS AND CHARLES A. WILLIAMS, OF CHICAGO, ILLINOIS.

MACHINE FOR SHEARING SHEET METAL.

SPECIFICATION forming part of Letters Patent No. 430,718, dated June 24, 1890.

Application filed August 3, 1889. Serial No. 319,630. (No model.)

*To all whom it may concern:*

Be it known that we, LEVI K. WILLIAMS and CHARLES A. WILLIAMS, citizens of the United States of America, residing at Chicago, in the county of Cook and State of Illinois, have invented certain new and useful Improvements in Machines for Shearing Sheet Metal, of which the following is a specification, reference being had therein to the accompanying drawings, and the letters of reference thereon, forming a part of this specification, in which—

Figure 1 is an end elevation of the machine and a side elevation of the clamp for grasping the sheet of metal to be cut. Fig. 2 is a top plan view of Fig. 1. Fig. 3 is a perspective view of a section of the guide for conducting the clamp, showing the means for securing it to its supporting-frame. Fig. 4 is a cross-section of the guide and of the lower jaw of the clamp and a side view of a box for securing the guide to a cross-bar of its supporting-frame; and Fig. 5 is a side view of the clamp for holding the sheet-metal to be cut, having a part broken away to show the manner in which its two parts are hinged together.

This invention relates to certain improvements in sheet-metal-cutting machines; and it consists, chiefly, of a guide or guides of various curvatures for conducting the sheet metal to be cut between the rotating shears in the proper direction to cut it in any form, governed by the form of the guide for directing the clamp that conducts the sheet metal through the machine, and in the combination of said guides with the other parts of the machine.

Referring to the drawings, W W represent a pair of ordinary rotating shears of a metal-shearing machine arranged in a frame on shafts common in such machines.

E is a table-top arranged at one side of the shears for supporting the sheet of metal P designed to be cut.

A is a clamp for grasping the sheet P and drawing it through between the shears. This clamp is composed of a pair of jaws hinged together at V and forked so as to extend each side of the shears to grasp the metal sheet, as shown in Fig. 2. The manner of hinging the two parts of the clamp together is shown in Figs. 2 and 5. The lower jaw is provided with a vertical port S, firmly fixed therein, which port passes through an aperture in the upper jaw, and a pin V passes through the upper jaw and said port so as to hinge the two parts together, as shown. The under side of the clamp A is provided with a downwardly-projecting pin C, having a cross-head for preventing it from disengaging from the channel of guide B.

D is a frame, having cross-bars or rods F provided with adjustable boxes H, adjustably secured to said rods by means of a set-screw.

B is a curved guide, secured on frame D through the medium of the boxes H, to which they are secured by set-screws, as shown in Fig. 4, and also secured to said frame at each end by means of a clamp and thumb-screw L. (Shown in Fig. 3.) Any other means may be used for securing said guide to the said frame or to any other convenient object for the purpose. The said curved guide is formed in cross-section, as shown in Figs. 3 and 4, so as to have the guide-channel J for the reception of the pin C of the clamp, as shown in Fig. 4, for the purpose of guiding the clamp in the course or direction of the said guide-channel and drawing the metal sheet P between the shears W W in the course controlled by the said channel, so that the sheet P may be cut into forms for such uses as stove-pipe elbows and the like. It is intended to have a number of these guides of various shapes for use in cutting various forms from the sheet P. Each guide causes the metal sheet to be cut into any number of pieces of exactly the same form. It is intended to either number or mark each guide, and also have a corresponding mark or number on the frame, indicating in what position to place each guide so that it will properly guide the clamp and the metal sheet to be cut in the direction controlled by the form of the guide.

In Fig. 2 the ends of the frame D are shown as provided with such numbers, and the guide shown is numbered to correspond with the number at which it is placed on the frame. These guides are intended to be of any curvature or form for guiding clamp to conduct the metal sheet between the shears to cut it in any form controlled by the curvature of the guide, so that whenever it is desired to cut the sheet metal in any desired form a guide is placed on the machine that will direct the sheet metal through between the shears in the proper course to cut such form.

We do not desire to limit ourselves to a guide or clamp constructed precisely like the one shown or to the particular mode or mechanism for securing the guide to the machine, but wish to cover, broadly, a guide substantially as shown, for the purpose set forth. The use of these curved guides dispenses with the use of patterns such as are ordinarily used in a shop for marking out on the metal sheet the form to be cut.

Having thus described our invention, what we claim as new, and desire to secure by Letters Patent, is as follows, to wit:

1. In the sheet-metal-shearing machine shown and described, the combination, with the shears and the clamp A, having the guide-pin C, and the curved guide or guides B, having the guide-channel J, substantially as and for the purpose set forth.

2. In the sheet-metal-shearing machine shown and described, the combination, with the rotary shears W, of the clamp A, having the guide-pin C, the curved guide or guides B, having the guide-channel J for receiving and guiding said clamp-pin, the frame D, having the cross-bars F, the boxes H, and clamp L, substantially as and for the purpose set forth.

LEVI K. WILLIAMS.
CHARLES A. WILLIAMS.

Witnesses:
LUCY M. GAYLORD,
PATRICK MCCAHILL.